June 14, 1927.

S. A. STEERE

PNEUMATIC TIRE

Filed Oct. 15, 1925   2 Sheets-Sheet 1

1,632,201

INVENTOR
Samuel A. Steere,
BY
ATTORNEY

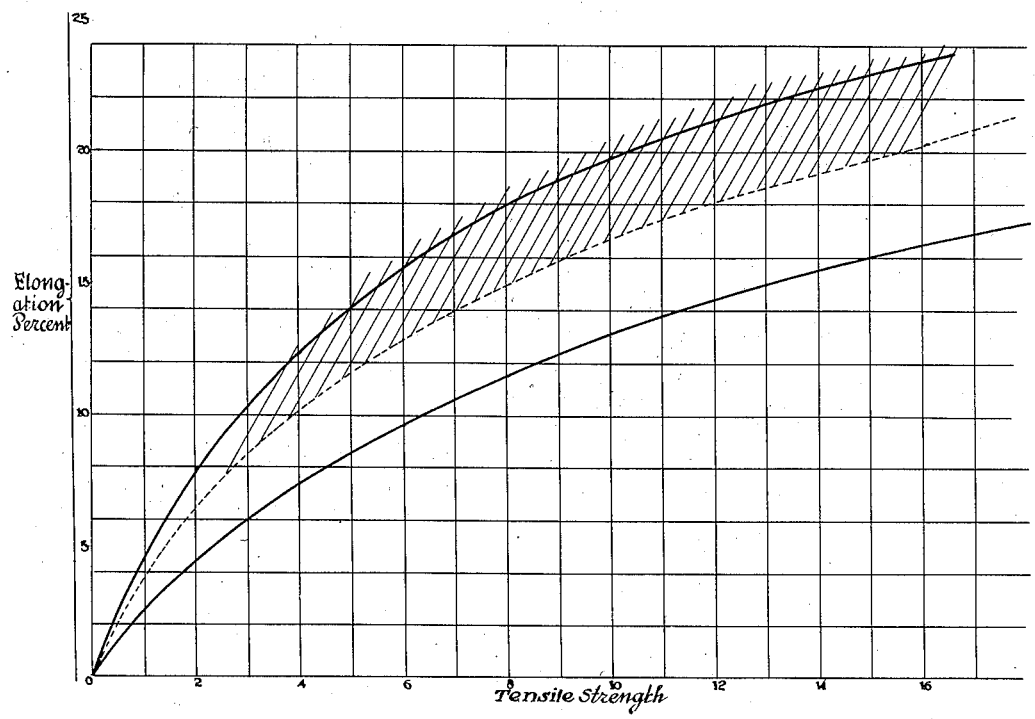
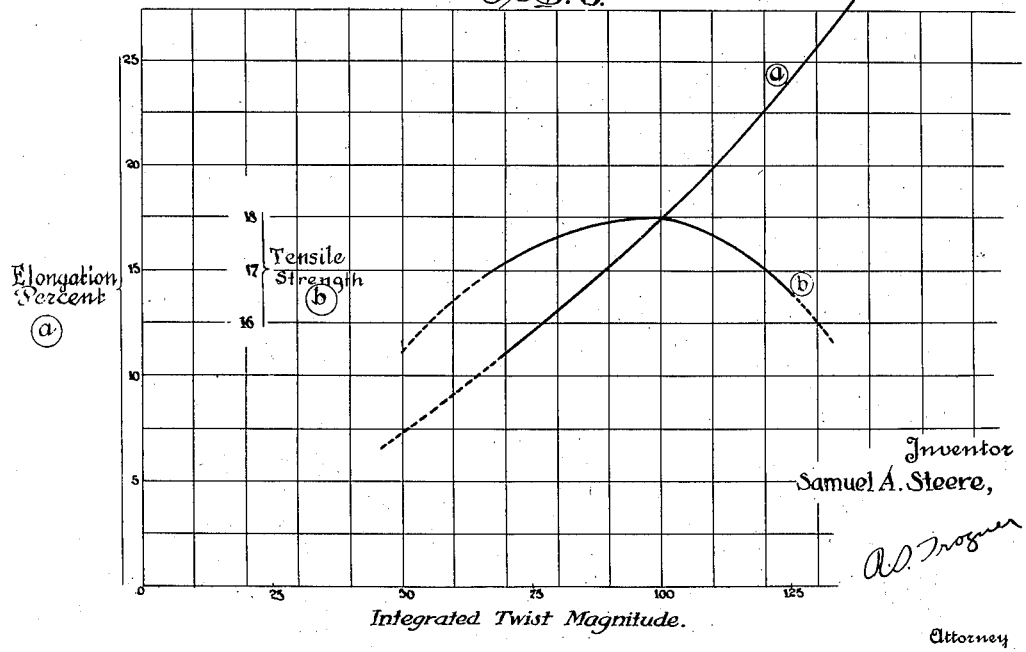

Patented June 14, 1927.

1,632,201

UNITED STATES PATENT OFFICE.

SAMUEL A. STEERE, OF AKRON, OHIO, ASSIGNOR TO THE GOODYEAR TIRE & RUBBER COMPANY, OF AKRON, OHIO, A CORPORATION OF OHIO.

PNEUMATIC TIRE.

Application filed October 15, 1925. Serial No. 62,580.

My invention relates to the art of manufacturing pneumatic tires and it has particular relation to tires whose fabric reinforcement includes a cord structure.

One object of my invention is to provide a fabricated product which will give improved service compared with present standards.

Another object of the invention is to provide a satisfactory cord fabric which may be spun from a shorter staple cotton.

Briefly, the invention provides for a fabric structure, the individual cords of which are particularly adapted to withstand the strain and distortion to which a tire is subjected. A cord embodying the principles of my invention is characterized by its greater elasticity and durability, higher twist, and a somewhat lower tensile strength than cords of substantially the same unit weight which have been utilized heretofore.

In order to have a clear understanding of my invention, reference may be made to the accompanying drawings, in which;

Fig. 3 is graphical representation illustrating the effect of the degree of twist on the tensile strength and elongation of a balanced cord; and Fig. 4 is a graphical comparison of the stress-strain characteristics, of a cord twisted to avail it of its maximum tensile strength with one embodying the principles of the present invention.

In its essentials, a cord tire comprises a tread 11, and bead portions 12 interconnected by a plurality of plies 13 of rubber impregnated fabric. In order to reduce the shocks occurring during the life of a tire, a breaker strip 14 is often applied between the tread and fabric reinforcement. It is the combination resulting from the incorporation of a new cord fabric in a rubber tire that is made the subject of this invention.

Figure 1:
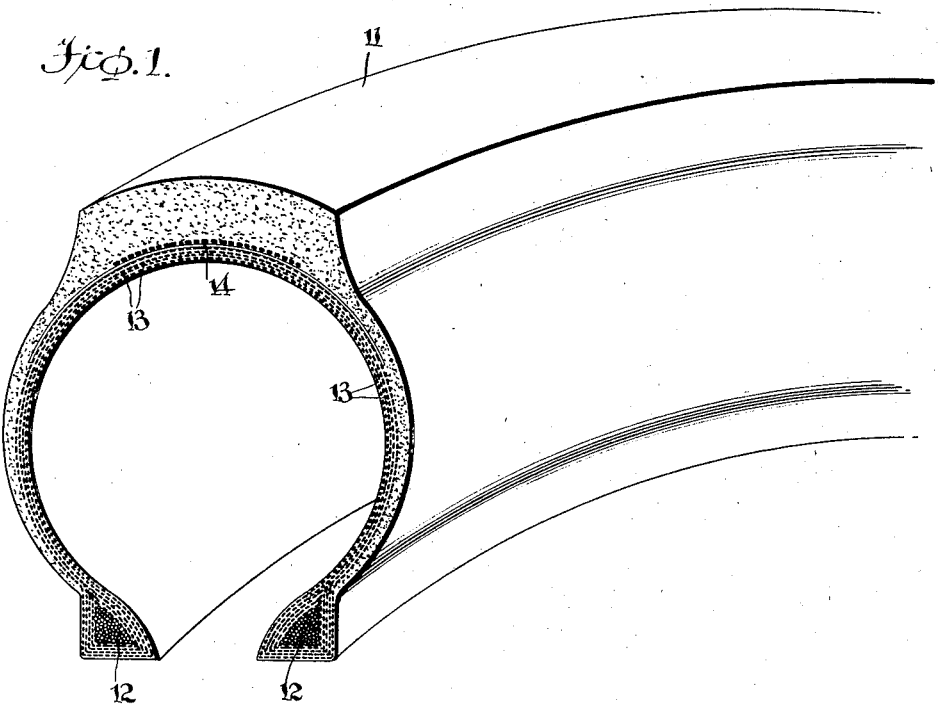
Fig. 1 is a perspective cross-sectional view of a tire illustrating a cord fabric carcass such as is involved in the present invention.
Figure 2:
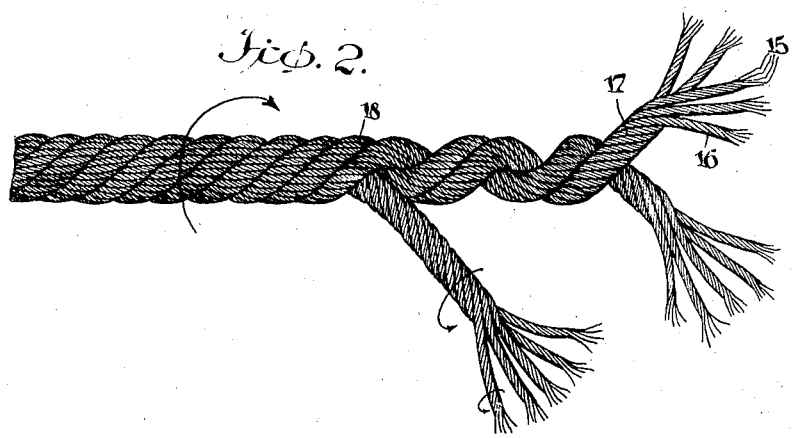
Fig. 2 is an elevational view of a portion of a cord illustrating the manner in which the subordinate elements are fabricated to form the yarns, strands, and finally the finished cord or cable.

With a few exceptions, it is universal practice in the tire industry to utilize a fabric, the individual cords of which are made up of three progressively twisted elements. This is illustrated in Fig. 2 wherein fibers 15 are spun to form yarns or singles 16, a plurality of which are twisted to form strands 17, and several of these in turn are twisted together to form the finished cable 18. The relative direction of twists is immaterial to the present invention in so far as the last two twisting operations are effected in opposite directions. Four possibilities so qualified will readily suggest themselves.

| | Yarn. | Strand. | Cable. |
|---|---|---|---|
| 1 | Reverse | Reverse | Regular. |
| 2 | Regular | Regular | Reverse. |
| 3 | Reverse | Regular | Reverse. |
| 4 | Regular | Reverse | Regular. |

While the three unit construction is the most popular, two as well as four unit products have been employed. It is not to be assumed from the illustration in Fig. 2 that the invention applies only to cords wherein five yarns are employed to form a strand and three of these strands united to form a finished cable. Nor is this improvement limited to yarns of any particular size, for while at the present time the industry favors a 23's yarn, the principle is equally applicable to 6's, 13's, 18's, 26's and others. For purposes of exemplification however, and because it is by far the most universally utilized, the cord of 23's/5/3 construction is hereinafter discussed.

Heretofore, the relationship which existed between the spinning of the cord fabric and the life of a tire was unrecognized. Because of this, together with the peculiar character of the spinning industry, wherein the personal element plays so important a part in the quality and uniformity of the product, tire manufacturers have seldom stipulated more than the size of the cord which they desires to utilize. The degree of twist and conditions under which the spinning was to be conducted were left wholly to the judgment and experience of the textile engineers. Under these conditions their unvarying procedure was to select the conditions and degree of twist which would result in a balanced cord having a maximum tensile strength.

According to present day practice the textile manufacturer determines the quality of his product by observing its tensile strength, balance, and uniformity. The first two properties are considered a direct measure of the utility of the cord when fabricated in the finished tire, and are controlling. The last named property merely reflects the condition of the mill and the workmanship and capability of its operators. A well-balanced cord whose tensile strength is at a maximum is the coveted goal of all textile producers and the tire manufacturers utilize such product in the tire carcass with a sense of satisfaction that the fabric reinforcement is at its best both as to tensile strength and durability. Obviously tire manufacturers are forced to tolerate certain fluctuations, inasmuch as it is quite impossible, from a production standpoint, to keep the machinery under such accurate control as to obviate them. The tolerance varies according to the marketing conditions and is not a standard or fixed figure at any time. However, a six per cent variation in the average tensile strength may be said to cover the range of good standard practice. It is difficult to state the acceptable variation in balance inasmuch as there is no recognized test which may be employed to measure this property. It is not difficult, however, to vary the degree of twist in order to maintain a satisfactory balance without materially affecting the tensile strength and certainly without exceeding its factor of tolerance.

The procedure in designing tires is almost entirely empirical. In selecting a cord, the designer calculates the number of plies according to the load to which the cord member will be subjected when the tire is inflated. For a 23's/5/3 construction, the allowable stress which the cord may undergo varies from two to three pounds. Such a cord is capable of supporting from sixteen to twenty pounds at its ultimate load; obviously, this provides a high factor of safety.

The lower line in Fig. 4 is a characteristic stress-strain curve of a cord which has been constructed to avail it of its maximum tensile strength. It is to be noted that this characteristic is general and is not limited to a specific construction. When the stress unit is expressed in pounds, the curve will apply to a 23's/5/3 construction. Thus, at the average breaking load of 17.5 pounds the cord elongates substantially 17.5 per cent of its original length.

I have found that by increasing the degree of twist in a cord, certain properties are accentuated, which render the cord particularly adaptable for tire construction. Thus, for example, the elongation may be increased 25 to 35 per cent, and at the same time the cord is given a harder texture. Obviously, a change of construction producing the increased elongation results in a decrease of the tensile strength of the cord. This is illustrated graphically in Fig. 3 wherein the elongation, represented by (*a*) and tensile strength, represented by (*b*), are plotted against the degree of twist. It must be stated that the chart applies only to balanced cords and that it is not readily suited to an unbalanced structure. From this it is apparent that the elongation increases rapidly as compared to the decrease in the tensile strength.

To illustrate what is meant by a highly twisted cord, as compared to one having a twist commensurate with a maximum tensile strength, the following table indicates the changes in specifications which are necessary in order to practice the invention in its preferred form.

| Construction. | Turns per inch in— | | |
| --- | --- | --- | --- |
| | Yarn. | Strand. | Cable. |
| A  23's/5/3 | 17 | 16.5 | 7.5 |
| B  23's/5/3 | 21.25 | 20.5 | 9.65 |
| B′ 23's/4/3 | 21.25 | 23.0 | 9.90 |

The specifications given under "A" are designed to produce a cord having a maximum tensile strength, which would correspond to an elongation at the breaking load of substantially 17.5 per cent. Those given under "B" are for a cord of 23's/5/3 construction whose tensile strength is somewhat less than the former cord but whose elongation at breaking load reaches 23—24 per cent. Those given under "B'" are for a cord exhibiting the high elongative properties which have been imparted to it at a reduction in the tensile strength but are for a 23's/4/3 construction. In the latter instance, inasmuch as the strand includes but four yarns, the number of turns per inch in the strand and cable twists are substantially higher than those of a 23's/5/3 construction.

It is difficult to state a twist specification as being a fixed standard because of the many variables which enter into the construction of a satisfactory cord product. For this reason it is belived that no standard specifications have ever been recognized, but a cord having a maximum tesile strength has a definite twist characteristic and it may be employed for purposes of comparison. Hence by taking the difference in the turns per inch which have been utilized in constructing the yarns of a cord having a maximum tensile strength and the yarns of a cord constructed in accordance to the principles herein set forth, and expressing the difference as a percent of the turns utilized in standard practice, one has a measure of the change necessary for that twist to practice the invention in its preferred form.

As indicated by examples A and B the difference in the yarn twists of the old and new constructions is 4.25 turns per inch. This expressed as a per cent of the recognized practice indicates that the change is substantially 25 per cent. In like manner, the change in the strand twist will be found to be 24.3 per cent and that of the cable twist 28.7 per cent.

The twist specifications, such as have been referred to, may be determined by counting the turns per inch necessary to unwind a given length of cord completely. The strands which result are subsequently likewise untwisted and the number of turns determined in the same manner. The same is true of the individual yarns or singles. It is appreciated that this method of analysis is not exact in that it does not take into consideration the contraction and extension of the subordinate twists relative to the length of the original cord sample, yet the method is recognized and employed in the textile strength art. The tensile of the cord product was determined by applying a load thereto at the rate of six pounds per minute. This method gives a somewhat lower breaking load than the standard Scott cord testing machine which requires but a few seconds to test the same size cord.

In order to determine the stress characteristics of the cord, a sample of approximately seventy centimeters is fastened to oppositely disposed jaws, one of which may be caused to recede at a rate of fourteen inches per minute. Of the test sample, a fifty centimeter length is laid off and the elongation thereof is recorded at the breaking load. It is to be noted that in conducting all of the physical tests the cords are first allowed to come to equilibrium at 70° F. in an atmosphere having a relative humidity ranging between 63 and 65 per cent. It will be found that under these conditions the cord will have a six per cent moisture content.

Referring again to my cord, it may be characterized in that the cable twist has 28 per cent more turns per inch than a cord having a like number of subordinate units, but which has been twisted to avail it of its maximum tensile. Or by adding the percentage increase in the number of turns per inch of the strand and cable twists, which in this instance is 53 per cent, one has an additional distinguishing feature of the present invention. In the same manner the total additive percentage increase of 78 per cent may be utilized to characterize my product. The twist specifications hold only for a cord of 23's/5/3 construction, although they are applicable to the several grades of cotton with substantially no change.

If the total additive percentage increase for the three twists be divided by three the result expresses an integrated value of the increase in degree of twist for the three operations. It cannot be said that the percentage increase expresses the increased number of turns in any twisting operation, but inasmuch as the limits within which the textile engineers must operate in order to secure a balanced cord are not wide, this integrated value is of considerable significance, particularly inasmuch as it is not limited to any cord construction or yarn size. It will be noted that Fig. 3 refers to the degree of twist, in terms of integrated twist magnitude. If the cord having a maximum tensile strength is arbitrarily given the value of 100, a cord which has been constructed according to the principles of my invention will have an elongation and tensile strength corresponding to one whose integrated twist is equal to 100 plus 78 per cent or substantially 126 per cent.

The graph illustrated in Fig. 4 applies to balanced cords generally and serves to illustrate by comparison the marked difference in stress-strain properties which distinguish cords constructed according to my invention from those constructed according to practices heretofore employed. Furthermore, the curves are applicable to any cords when interpreted relatively. Thus, instead of stating the stress units in pounds, in which case they are applicable to a 23's/5/3 construction, they may be interpreted relatively. In so doing the lower curve will always represent the stress-strain characteristic of a balanced cord twisted for the purpose of securing the ultimate strength, whereas the upper curve is descriptive of a cord of substantially the same unit weight embodying the principles of my invention.

An additional property which characterizes this invention is that of its durability as measured by a machine, such as described in patent application, Serial No. 628,611. I have compared results of tests on cords constructed to avail them of their maximum tensile strength with those of my more highly twisted construction. The average results for a cord of 23's/5/3 construction are tabulated below. In these tests, the cord was caused to oscillate about a half inch pulley at a rate of 340 cycles per minute while under a tension of 4.75 pounds.

| Construction. | Time in minutes. | Average increase in durability. |
|---|---|---|
| Old | 100–125 | |
| New | 170–200 | 63% |

From these figures it will be apparent that the higher twist increases the durability even though the product itself has a somewhat lower tensile strength.

It has been found that the life of the cord is dependent in part upon its history. This is in some way identical to the phenomenon which has been recognized in determining the tensile strength of a fibrous product. For example, if a cord whose tensile strength is twenty pounds is subjected to an unvarying load of eighteen pounds, it will fail in about twenty minutes. In other words, the life of the fibrous product is not wholly dependent upon the stress to which it is subjected, but is contingent upon the condition of the cord prior to the test. For this reason, the samples which were tested were under no stress before the magnitude of the particular property was determined. The durability test measures an additional property, which distinguishes the present invention.

When a cord, such as has been described, is incorporated in a tire, the new properties which have been imparted to it bring about reactions entirely foreign to those of cords constructed according to present day practice. For example, its more elastic nature along with its harder and more resistive character permits it to withstand more effectively the strains to which a tire is subjected.

Summarizing, it is to be observed that my fabric resists compression, favors elongation, is not easily subjected to chafing action, and, as a whole, reacts less destructively when subjected to flexure and contraction, than fabric which has been constructed according to the recognized practice. I have prepared and tested tires whose fabric carcasses embodied the principles of my invention and have compared the results with tires constructed similarly with the exception of the degree of twist in the cords. The results indicate that an increased mileage of from 60 to over 100 per cent may be enjoyed by utilizing the more highly twisted structure. These tests were made under actual road conditions.

| Test. | Size. | No. of plies. | Construction. | Road mileage. | | Increased mileage in percent. |
|---|---|---|---|---|---|---|
| | | | | Old twist. | New twist. | |
| A | 30x3½ | 4 | 23's/5/3 | 6,279 | 13,954 | 120 |
| B | 30x3½ | 4 | 23's/4/3 | 4,724 | | |
| C | 31x4 | 6 | 23's/5/3 | | 8,383 | 77 |
| D | 31x4 | 6 | 23's/4/3 | 3,760 | 8,840 | 135 |
| E | 32x4½ | 6 | 23's/5/3 | 3,110 | 10,230 | 229 |
| F | 32x4½ | 6 | 23's/5/3 | 3,240 | 12,730 | 293 |
| G | 32x4½ | 6 | 23's/5/3 | 3,010 | 6,235 | 107 |
| H | 32x4½ | 6 | 23's/5/3 | 6,734 | | |
| I | 33x5 | 8 | 23's/5/3 | | 10,827 | 61 |
| J | 33x5 | 8 | 23's/4/3 | 6,836 | | |
| K | 40x8 | 12 | 23's/5/3 | | 16,925 | 147 |
| L | 40x8 | 12 | 23's/5/3 | 8,840 | 20,480 | 132 |
| M | 40x8 | 12 | 23's/5/3 | 7,290 | 18,350 | 152 |
| N | 40x8 | 12 | 23's/5/3 | 5,940 | 10,620 | 79 |
| O | 40x8 | 12 | 23's/5/3 | | | |

In several instance the comparisons have been drawn between tires embodying the new fabric of 23's/4/3 construction whereas the old fabric was that of 23's/5/3. Obviously this places the former at a disadvantage. Nevertheless the mileage results are decidedly in favor of the smaller cord. In other instances, the tests were conducted in such manner as to favor the present day or old construction. For example, the tire mileage listed for the old construction in test "O" is the average obtained from eleven tires. In conducting the experiments many more tires embodying the same construction were employed but where the test ended because of bruises, snagging and similar failures which have no bearing upon the life of the fabric, the mileages were not included. Only those tires which failed as a result of fabric fatigue were utilized in making up the average. On the other hand, of the three tires which were constructed in the same manner as the eleven whose average mileage was 5,940 miles but whose cord construction embodied the principles of my invention, one failed as a result of a bruise, another a snag and the other as a result of ply separation. The average mileage however aggregated 10,600 miles. It should be noted that only the last mentioned tire failed as a result of tire fabric fatigue.

In some instances the tests were conducted so as to subject the new construction to additional hazards. These include under-inflation and overloading. The effect of the latter will be appreciated by comparing the mileage results of "M," "N," and "O." The first two were conducted under similar conditions and the results indicate that the fabric gave 132 and 152 per cent respectively longer life. In the latter case, however, the tire embodying the old construction was subjected to a load of 4,500 pounds whereas the tire embodying the new construction was subjected to an additional load of five hundred pounds. This accounts for what might appear to be a discrepancy since the life has been prolonged merely an additional 79 per cent of that of the old construction as compared to the other tests, which easily doubled the life of the former construction. Other interesting features of the test might be narrated, but they are unnecessary to the practicing of the principles which have been hereinabove set forth.

As stated above, these results are the averages which have been obtained under road conditions. For this reason other destructive agencies were present which undoubtedly had a marked effect in determining the life of the tire. It may safely be stated, however, that inasmuch as the tests were run under like conditions, the results prove that the fabric alone is responsible for this marked improvement. To further substantiate this contention, the type of failures was consistent. In the case of the old construction, the "shoulder break" determined the life of the tire, whereas tires embodying cords constructed according to the principles of my invention were giving service even after the tread had been worn to the breaker strip without any indication of shoulder break weakness.

While actual road tests are, in the final analysis, the best measure of the quality of a tire, it must be admitted that many factors are present which may defeat the purpose of a test, as in this case to determine the value of a fabric. In order to obviate these disturbing influences, and to ascertain the value of the new construction by other means, a large number of runs have been made on an artificial road tester. The results are tabulated below.

| Test. | Size. | No. of plies. | Construction. | Road mileage. | | Increased mileage in per cent. |
|---|---|---|---|---|---|---|
| | | | | Old twist. | New twist. | |
| P | 32x4½ | 6 | 23's/5/3 | 5,775 | 12,990 | 126 |
| Q | 32x4½ | 6 | 23's/5/3 | 7,430 | 13,530 | 82 |
| R | 32x4½ | 6 | 23's/5/3 | 5,500 | 9,700 | 76 |
| S | 32x4½ | 6 | 23's/5/3 | 2,890 | 5,910 | 104 |
| T | 32x4½ | 6 | 23's/5/3 | 3,560 | 7,820 | 120 |
| U | 32x4½ | 6 | 23's/5/3 | 2,430 | 4,690 | 93 |

It must be stated that the mileages are not comparable with those obtained under actual road conditions inasmuch as the cleated surface over which the tire must pass is far more severe in its action on the fabric reinforcement than an average road. Numerous comparative tests indicate that one mile on the testing machine is equivalent to two or three miles under actual service conditions.

In practicing the principles of my invention, it is possible to use a less expensive grade of cotton. The long staple fibers which were believed to be essential to the life of a tire fabric are now no longer necessary. The results of experiments indicate that the controlling factor which determines the life of a tire embodying the principles of this invention is no longer its fabric structure, but depends largely on the wearing ability of the tread. I believe that the new and desirable properties imparted to a cord, which is incorporated in a tire resides in its increased durability and its ability to undergo greater elongation. Nevertheless, I do not limit myself thereby. Moreover, any theories which I have set forth in attempting to explain the reactions and mechanics of cords incorporated in a pneumatic tire are not to be held as limitations of my invention.

Although I have described the principles of my invention as applied to a dry twist cord embodying a specific construction and having yarn of but one number, it will be obvious to those skilled in the art that the principles hereinabove set forth may be extended to cords having other yarn numbers and combinations whether twisted wet or dry and that they may be subjected to wide variations without departing from the scope thereof. I desire, therefore, that limitations be imposed only to accord with prior art and the appended claims.

What I claim is:

1. In a tire, a cord fabric carcass embodying cords having a substantially higher twist than that which is necessary to produce the maximum tensile strength therein.

2. In a pneumatic tire, a cord fabric carcass embodying cords whose cable has substantially eighteen per cent more twist than that necessary to produce a cord of maximum tensile strength.

3. In a pneumatic tire, a cord fabric carcass embodying cords whose cable has substantially eighteen per cent more twist than that necessary to produce a cord of maximum tensile strength, and an elongation at breaking load of more than twenty per cent.

4. In a pneumatic tire, a cord fabric carcass embodying cords whose strand has substantially eighteen percent more twist than that necessary to produce a cord having maximum tensile strength, and an elongation at breaking load of more than eighteen per cent.

5. A tire fabric embodying cords having relatively high degree of twist with respect to the twist required to produce cords of maximum tensile strength.

6. A tire fabric embodying cords having a substantially higher degree of twist than cords of the same unit weight which have been twisted to avail them of their maximum tensile strength.

7. In a pneumatic tire, a cord fabric carcass embodying cords each so twisted as to produce a substantially greater elongation at breaking load than a similar cord of the same unit weight so twisted as to avail it of its maximum tensile strength.

8. In a pneumatic tire, a cord fabric carcass embodying cords of 23's/5/3 construction the component parts of each of which are so twisted as to produce an elongation at breaking load of at least 21 percent.

9. In a pneumatic tire, a cord fabric carcass embodying cords, the component parts of each of which are so twisted as to produce an elongation at breaking load of at least 21 percent.

In witness whereof, I have hereunto signed my name.

SAMUEL A. STEERE.